(12) United States Patent
Hachisuga et al.

(10) Patent No.: US 9,181,059 B2
(45) Date of Patent: Nov. 10, 2015

(54) CONVEYANCE APPARATUS AND CONVEYANCE SYSTEM

(71) Applicant: FUJI XEROX CO., LTD., Tokyo (JP)

(72) Inventors: Masaki Hachisuga, Kanagawa (JP); Takao Furuya, Kanagawa (JP); Yoshinari Iwaki, Kanagawa (JP); Kiyofumi Aikawa, Kanagawa (JP); Seigo Makida, Kanagawa (JP); Yoshio Mochizuki, Nagano (JP); Eiji Aoki, Nagano (JP); Tatsuyoshi Mori, Nagano (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/182,572

(22) Filed: Feb. 18, 2014

(65) Prior Publication Data

US 2015/0061209 A1 Mar. 5, 2015

(30) Foreign Application Priority Data

Aug. 30, 2013 (JP) .................................. 2013-179881

(51) Int. Cl.
*B65H 15/00* (2006.01)
*B65H 29/58* (2006.01)
(Continued)

(52) U.S. Cl.
CPC ................ *B65H 29/58* (2013.01); *B65H 15/00* (2013.01); *G03G 15/00* (2013.01); *G03G 15/238* (2013.01); *G03G 15/5062* (2013.01); *G03G 15/6573* (2013.01); *H04N 1/00* (2013.01); *B65H 2301/3122* (2013.01); *B65H 2301/31124* (2013.01); *B65H 2301/34* (2013.01)

(58) Field of Classification Search
CPC ..................... G03G 15/238; B41J 3/60; B65H 2301/31124; B65H 2301/3122; B65H 2301/34; B65H 15/00

USPC .................. 271/225, 184, 186; 399/374, 364; 358/408, 496, 498
See application file for complete search history.

(56) References Cited

U.S. PATENT DOCUMENTS 6,212,357 B1 * 4/2001 Boehmer et al. .............. 399/401
6,397,023 B1 * 5/2002 Underwood et al. ........... 399/82
(Continued)

FOREIGN PATENT DOCUMENTS

JP   2002-359725   12/2002
JP   2005-205706    8/2005
(Continued)

OTHER PUBLICATIONS

Japanese Office Action in JP 2013-179881 dated Jan. 21, 2014 and English translation.

(Continued)

*Primary Examiner* — Luis A Gonzalez
(74) *Attorney, Agent, or Firm* — Fildes & Outland, P.C.

(57) ABSTRACT

A conveyance apparatus includes: a first conveying unit that includes a first conveyance passage along a first direction forming an angle with respect to a horizontal direction, and conveys a medium in the first direction; a returning conveyance unit that conveys the medium towards a second direction having a component of an opposite direction to the first direction; a second conveying unit that includes a second conveyance passage along the second direction, and conveys the medium in the second direction; a first processing unit that is disposed on the first conveyance path, and performs processing on a first surface of the conveying medium; and a second processing unit that is disposed at a position closer to the returning conveyance unit than the first processing unit, and performs processing on a second surface of the conveying medium.

11 Claims, 8 Drawing Sheets

(51) Int. Cl.
*G03G 15/23* (2006.01)
*G03G 15/00* (2006.01)
*H04N 1/00* (2006.01)

(56) References Cited

U.S. PATENT DOCUMENTS

| | | | |
|---|---|---|---|
| 7,561,315 B2 * | 7/2009 | Hiraoka et al. | 358/498 |
| 8,876,280 B2 * | 11/2014 | Ishikawa et al. | 347/104 |
| 2009/0168127 A1 | 7/2009 | Hamada et al. | |
| 2013/0182298 A1 * | 7/2013 | Tu et al. | 358/498 |

FOREIGN PATENT DOCUMENTS

| | | |
|---|---|---|
| JP | 2009-164764 | 7/2009 |
| JP | 2012203162 A * | 10/2012 |
| JP | 2013-145305 | 7/2013 |

OTHER PUBLICATIONS

English language abstract of JP 2002-359725.
English language abstract of JP 2005-205706.
English language abstract of JP 2013-145305.

* cited by examiner

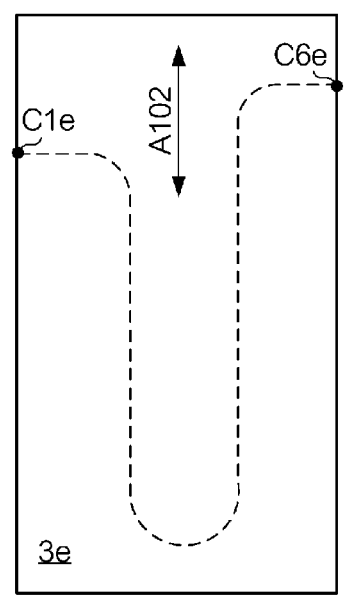 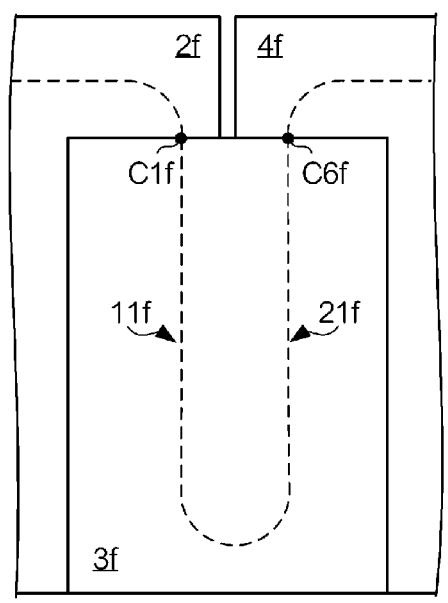

CONVEYANCE APPARATUS AND CONVEYANCE SYSTEM

CROSS-REFERENCE TO RELATED APPLICATIONS

This application is based on and claims priority under 35 U.S.C. 119 from Japanese Patent Application No. 2013-179881 filed on Aug. 30, 2013.

BACKGROUND

The present invention relates to a conveyance apparatus and a conveyance system.

SUMMARY

According to an aspect of the present invention, it is a conveyance apparatus including: a first conveying unit that includes a first conveyance passage along a first direction forming an angle with respect to a horizontal direction, and conveys a medium in the first direction; a returning conveyance unit that conveys the medium conveyed by the first conveying unit towards a second direction having a component of an opposite direction to the first direction; a second conveying unit that includes a second conveyance passage along the second direction, and conveys the medium conveyed by the returning conveyance unit in the second direction; a first processing unit that is disposed on the first conveyance path, and performs processing on a first surface of the conveying medium; and a second processing unit that is disposed on a downstream side of the first processing unit in a conveyance path of the medium and disposed at a position closer to the returning conveyance unit than the first processing unit, and performs processing on a second surface of the conveying medium, the second surface being an opposite side to the first surface.

BRIEF DESCRIPTION OF THE DRAWINGS

Exemplary embodiment(s) of the present invention will be described in detail based on the following figures, wherein

FIGS. 9A and 9B are views illustrating an example of a configuration of a conveyance apparatus according to another modified embodiment.

DETAILED DESCRIPTION

[1] Exemplary Embodiment

[1-1] Entire Configuration

Figure 1:
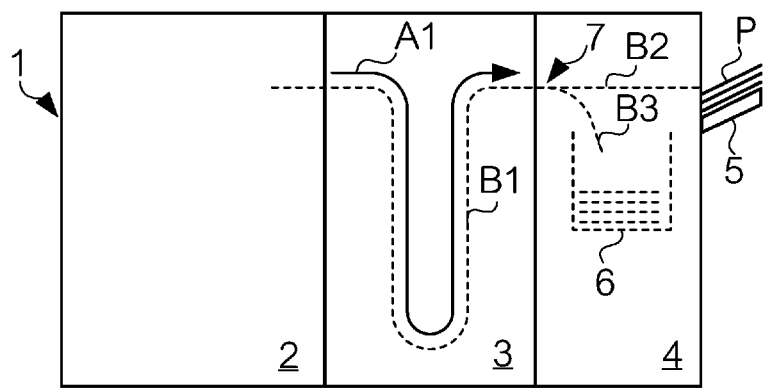
FIG. 1 is a view illustrating an example of a configuration of an image inspection system according to an exemplary embodiment.

FIG. 1 is a view illustrating an example of an entire configuration of an image inspection system according to an exemplary embodiment. In this example, an image inspection system 1 includes a pre-processing apparatus 2, a conveyance apparatus 3 and a post-processing apparatus 4. These apparatuses are connected to each other by a communication line which is not illustrated, and data are exchanged between the apparatuses through the communication line.

The pre-processing apparatus 2 conveys a sheet type medium such as A4- or A5-size paper, and performs processing (hereinafter, referred to as "pre-processing") on the medium. In the present exemplary embodiment, the pre-processing apparatus 2 performs, as pre-processing, image forming processing that forms an image displayed by image data on the conveying medium. The pre-processing apparatus 2 forms images on both surfaces of the medium, and discharges the medium towards the conveyance apparatus 3. Further, the pre-processing apparatus 2 transmits the image data used for forming the images to the post-processing apparatus 4.

The conveyance apparatus 3 conveys the medium discharged from the pre-processing apparatus 2 towards a conveyance direction A1 as indicated by an arrow in FIG. 1 and along a conveyance path B1 as indicated by a broken line in FIG. 1 to the post-processing apparatus 4. The conveyance path B1 connects the pre-processing apparatus 2 to the post-processing apparatus 4 not in a straight line but so as to detour in a "U" shape while changing the direction on the way. The conveyance apparatus 3 is provided with a unit configured to read an image, such as a scanner, and reads the image formed on the medium that is conveyed along the conveyance path B1. After the image is read, the conveyance apparatus 3 transmits result data representing the results to the post-processing apparatus 4.

The post-processing apparatus 4 performs processing (hereinafter, referred to as "post-processing") on the medium discharged from the conveyance apparatus 3. Hereinafter, the post-processing will be described in detail. Based on the image data transmitted from the pre-processing apparatus 2 and the result data transmitted from the conveyance apparatus 3, the post-processing apparatus 4 determines whether or not an image represented by the image data is formed accurately on the medium (that is, image accuracy). Particularly, the post-processing apparatus 4 calculates a degree of conformity between the image represented by the image data and the image represented by the result data, and if the calculated degree exceeds a threshold value, determines that the image is formed accurately on the medium. Further, the post-processing apparatus 4 may implement this determination using other well-known techniques.

The post-processing apparatus 4 includes a first holding unit 5 configured to hold a medium conveyed along a conveyance path B2 as indicated by a broken line in FIG. 1, a second holding unit 6 configured to hold a medium ejected along a conveyance passage B3, and a switching unit 7 configured to switch between the conveyance paths B2 and B3. Based on the result from the determination, the post-processing apparatus 4 conveys a medium which is determined that the image is formed accurately thereon to the first holding unit 5, and conveys a medium which is determined that the image is not formed accurately thereon to the second holding unit 6. At this time, if the medium is not conveyed to an intended conveyance path, the post-processing apparatus 4 activates the switching unit 7 to perform switching processing that switch the conveyance path. As described above, the post-processing apparatus 4 performs post-processing such as determination of the image accuracy, switching processing and conveyance of the medium to the respective holding units.

As described above, the image inspection system 1 inspects whether or not the image as represented by the image data is formed accurately on a medium, sorts out a medium on which the image is formed accurately and a medium on which the image is not formed accurately and hold them. Further, the determination of the image accuracy may be performed by the conveyance apparatus 3 instead of the post-processing apparatus 4. In that case, the conveyance apparatus 3 transmits the result data representing the determination results to the post-processing apparatus 4. Based on the determination results, the post-processing apparatus 4 performs the switching processing if necessary.

[1-2] Hardware Configuration

Figure 2:
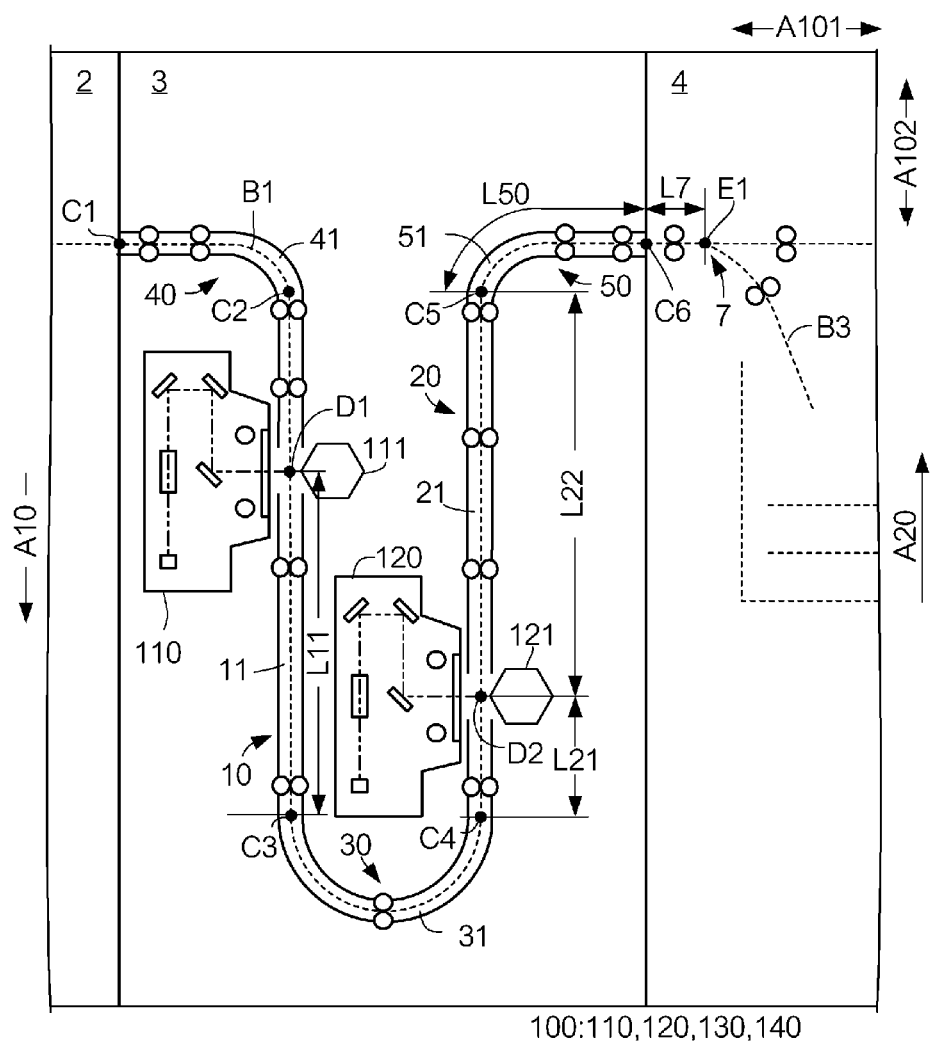
FIG. 2 is a view illustrating an example of a configuration of an image reading apparatus.

FIG. 2 is a view illustrating an example of a hardware configuration of the conveyance apparatus 3. The conveyance apparatus 3 includes a first conveying unit 10, a second conveying unit 20, a returning conveyance unit 30, a feeding unit 40, a discharging unit 50 and a processing unit 100.

[1-2-1] Conveying Unit

Each of the conveying units includes a set of rollers that are supported rotatably around an axis, and a conveyance passage member that forms a conveyance passage along the conveyance path B1 as illustrated in FIG. 1. Each of the conveying units rotates each roller to apply a driving force to the medium caught in a nip region formed by a set of rollers, allows the medium that is applied with a driving force to pass through the conveyance passage formed by the conveyance passage member, thereby conveying the medium along the conveyance path B1. Hereinafter, each of the conveying units will be described in detail.

The feeding unit 40 conveys (feeds) a medium discharged from the pre-processing apparatus 2 in a feeding conveyance passage 41 up to the first conveying unit 10. The feeding conveyance passage 41 connects a feeding position C1 in which the medium is fed to the conveyance apparatus 3 to an inlet C2 of the first conveying unit 10. The feeding conveyance passage 41 extends along a horizontal direction A101 at the feeding position C1, and is formed in an arc so as to change the direction gradually downwardly in a vertical direction A102 in the direction along the vertical direction A102 when reaching the inlet C2.

The first conveying unit 10 includes a first conveyance passage 11 along a first direction A10. The first conveying unit 10 conveys the medium in the first direction A10 in the first conveyance passage 11 along the first direction A10. The first direction A10 is a direction forming an angle with respect to the horizontal direction A101. In the present exemplary embodiment, the first direction A10 is a direction orthogonal to the horizontal direction A101 and along the vertical direction A102. The first conveyance passage 11 is a conveyance passage which connects the inlet C2 of the first conveying unit 10 to an inlet C3 of the returning conveyance unit 30.

The returning conveyance unit 30 conveys the medium conveyed by the first conveying unit 10 so as to be folded back towards a second direction A20 opposite to the first direction A10. The returning conveyance unit 30 conveys the medium in a returning conveyance passage 31 that connects the inlet C3 of the returning conveyance unit 30 to an inlet C4 of the second conveying unit 20.

The second conveying unit 20 includes a second conveyance passage 21 along the second direction A20. The second conveying unit 20 conveys the medium conveyed by the returning conveyance unit 30 in the second direction A20 in the second conveyance passage 21 along the second direction A20. The second direction A20 is a direction opposite to the first direction A10, and thus, forming an angle with respect to the horizontal direction A101. In the present exemplary embodiment, the second direction A20 is a direction orthogonal to the horizontal direction A101 and along the vertical direction A102. The second conveyance passage 21 is a conveyance passage that connects the C4 of the second conveyance passage 21 to an inlet C5 of the discharging unit 50.

The discharging unit 50 conveys (discharges) a medium conveyed by the second conveying unit 20 in a discharging conveyance passage 51 up to the post-processing apparatus 4. The discharging conveyance passage 51 connects the inlet C5 of the discharging unit 50 to a discharging position C6 in which the medium is discharged from the conveyance apparatus 3. The discharging conveyance passage 51 is formed in an arc so as to change the direction gradually in the horizontal direction A101 from the inlet C5 in the direction along the horizontal direction A101 and then reach the discharging position C6. That is, the inlet C5 represents a position at which a straight-line conveyance passage along the second direction A20 (second conveyance passage 21) finishes. From there, an arc conveyance passage (a part of the discharging conveyance passage 51) continues.

[1-2-2] Processing Unit

The processing unit 100 performs processing on the conveying medium (hereinafter, referred to as "medium processing") in one or both of the first conveyance passage and the second conveyance passage. In the present exemplary embodiment, the processing unit 100 performs processing of reading an image formed on a surface of the medium (hereinafter, referred to as "image reading processing") as the medium processing in both of the first conveyance passage 11 and the second conveyance passage 21. The processing unit 100 includes a first processing unit 110, a first relevant member 111, a second processing unit 120 and a second relevant member 121.

The first processing unit 110 is an example of a unit that performs processing on a first surface of the conveying medium in the first conveyance passage 11. In the present exemplary embodiment, the first processing unit 110 is installed on a pre-processing apparatus 2 side of the first conveyance passage 11, and performs processing of reading an image formed on the first surface (that is, the image reading processing). The first surface faces the pre-processing apparatus 2 side of the conveying medium in the first conveyance passage 11. In FIG. 2, a first processing position D1 is illustrated, in which the image reading processing is performed on the medium by the first processing unit 110. At the first processing position D1, the medium is conveyed in the first direction A10.

The first relevant member 111 is disposed at a position opposite to the first processing unit 110 across the first conveyance passage 11, and is an example of a member that perform an operation for the processing by the first processing unit 110. In the present exemplary embodiment, the first relevant member 111 is a prismatic member, which has test images expressing a plurality of colors, for example, red and yellow, formed on its outer peripheral surface. The first processing unit 110 stores color information (e.g., color and density) of the test images in advance, and compensates the color of the image which has been read, based on the results of the image reading processing and the stored information. As such, the first relevant member 111 performs an operation for the color compensation of the image read in the image reading processing.

The second processing unit 120 is an example of a unit that performs processing on a second surface of the medium, which is an opposite side to the first surface, which is being conveyed in the first or second conveyance passage. In the present exemplary embodiment, the second processing unit 120 is installed on a pre-processing apparatus 2 side of the second conveyance passage 21, and performs processing of reading an image formed on the second surface (that is, the image reading processing). The second surface faces the pre-processing apparatus 2 side of the conveying medium in the second conveyance passage 21. In FIG. 2, a second processing position D2 is illustrated, in which the image reading processing is performed on the medium by the second processing unit 120. At the second processing position D2, the medium is conveyed in the second direction A20.

The second relevant member 121 is disposed at a position opposite to the second processing unit 120 across the conveyance path (the second conveyance passage 21 in the example of FIG. 2), and is an example of a member that perform an operation for the processing by the second processing unit 120. The second relevant member 121 performs the same operation as the first relevant member 111. As described above, the first relevant member and the second relevant member 121 corresponding to the first processing unit 110 and the second processing unit 120, respectively, are provided to perform an operation for color compensation of the image read in the performed processing (that is, the image reading processing).

[1-3] As for Shape of Conveyance Path

In the present exemplary embodiment, each conveyance passage is formed such that the conveyance path B1 has a "U" shape. In the straight-line portion of this U shape, the medium is conveyed in a height direction of the conveyance apparatus. As a result, in a case of securing a conveyance path with a length required to perform the medium processing on the medium, the width required for the conveyance apparatus is smaller, as compared with a configuration in which the medium is not conveyed in the height direction. Further, the width as used herein refers to a dimension of the conveyance apparatus in a direction from the pre-processing apparatus 2 towards the post-processing apparatus 4. A "width" as mentioned below means the dimension. Further, in the present exemplary embodiment, the medium conveyed in the first direction is also conveyed in the second direction which is an opposite direction thereto. As a result, in a case of securing a conveyance path with a length required for the medium processing, the height required for the conveyance apparatus is smaller as well.

[1-4] as for Disposition of Processing Unit

In the present exemplary embodiment, each processing unit is disposed as follows.

In the conveyance apparatus 3, given that the length from the first processing position D1 by the first processing unit 110 to the outlet of the first conveyance passage 11 (that is, the inlet C3 of the returning conveyance unit 30) is regarded as L11, and the length from the inlet C4 of the second conveyance passage 21 to the second processing position D2 by the second processing unit 120 is regarded as L21, the length L11 is larger than the length L21. That is, the second processing unit 120 is disposed at a position closer to the returning conveyance unit 30 than the first processing unit 110.

The above-described switching processing performed by the post-processing apparatus 4 should be performed until the medium in which an image is read reaches a switching position (E1 in FIG. 2) at which switching is performed by the switching unit 7. The reason is that, if the medium reaches the switching position E1 before the switching processing is completed, a medium determined that an image is formed accurately may be discharged to the second holding unit 6, or a medium determined that an image is not formed accurately discharged to the first holding unit 5, that is, errors may be caused in the post-processing. In order to prevent the errors from being caused in the post-processing, it is desirable to increase the time required to convey the medium from the second processing position D2 to the switching position E1 as possible.

In other words, it is preferred that the distance along the conveyance path from the second processing position D2 to the switching position E1 (a distance in which the medium is conveyed to a position after the second processing position D2 and before the switching position E1; hereinafter, referred to as a "pre-switching distance") is as longer as possible. In the present exemplary embodiment, the second processing unit 120 is disposed as described above. Accordingly, the pre-switching distance is longer, as compared with its opposite configuration, that is a configuration in which the second processing unit 120 is not disposed at a position closer to the returning conveyance unit 30 than the first processing unit 110 (comparative configuration; hereinafter, referred to as "Configuration 1"). As a result, in the present exemplary embodiment, a time for determining the image accuracy may be increased, and the above-described errors are hardly caused in the post-processing, as compared with Configuration 1. The time for determining the image accuracy refers to a time required to perform a determination based on the results of the processing (the image reading processing in the present exemplary embodiment) performed on the both surfaces of the medium.

The pre-switching distance is represented as a sum (L22+L50+L7) of a length L22 along the conveyance path from the second processing position D2 to the outlet of the second conveyance passage 21 (that is, the inlet C5 of the discharging unit 50), a length L50 along the conveyance path B1 from the inlet C5 to the discharging position C6, and a length L7 along the conveyance path from the discharging position C6 to the switching position E1. In the image inspection system, the pre-switching distance is set to be equal to or longer than the maximum length of the medium in a conveyance direction A1 (that is, the length in the conveyance direction A1). For example, in a case where the medium of which the length in a conveyance direction A1 is maximum is an A3-sized medium and a longer side of the medium is conveyed along the conveyance direction A1, the pre-switching distance is set to be longer than the length of the longer side of the A3-sized medium. Hereinafter, such a length is referred to as "a maximum medium length".

Figure 3A:
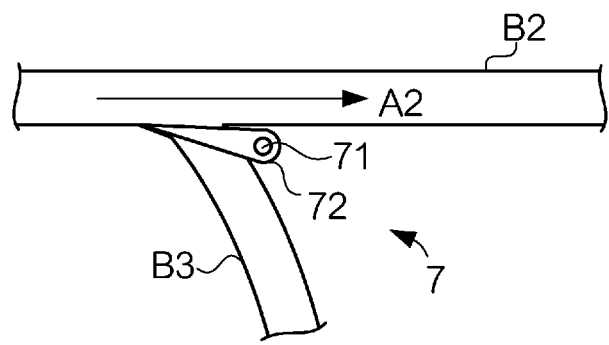
FIGS. 3A and 3B are enlarged views illustrating a switching unit.
Figure 3B:
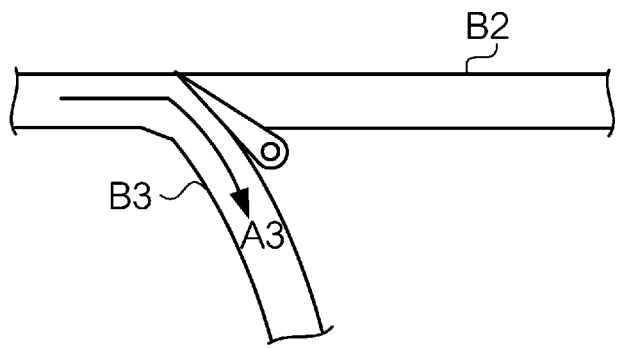

At the switching position E1, the conveyance state of the medium may be changed in some cases. The change in the conveyance state means that the force applied to the conveying medium is changed, and the medium behaves differently than before by the changed force. The change in the conveyance state includes deflection and/or shaking of the conveying medium due to a collision between the medium and the conveyance passage and/or a change of the conveying speed of the medium. Referring to FIGS. 3A and 3B, description will be made on the change in the conveyance state at the switching position E1.

FIGS. 3A and 3B are views illustrating the switching unit 7 in an enlarged scale. The switching unit 7 includes a rotating member 72 that rotates around an axis 71. FIG. 3A illustrates a state of the rotating member 72 when the medium is conveyed to the conveyance path B2, and FIG. 3B illustrates a state of the rotating member 72 when the medium is conveyed to the conveyance path B3. As illustrated in FIG. 3A, the medium conveyed to the conveyance path B2 is conveyed in the conveyance direction A2 as indicated by a straight arrow without colliding with the rotating member 72. On the contrary, as illustrated in FIG. 3B, the medium conveyed to the conveyance path B3 collides with the rotating member 72, and thus, is conveyed in the conveyance direction A3 as indicated by a bent arrow, as compared with a case where the pre-switching distance is shorter than the maximum medium length.

The medium which has collided with the rotating member 72 may be bent by a force in an opposite direction to the conveyance direction A3, which is applied from the rotating member 72. As such, the switching position E1 is also a position at which the conveyance state is changed (hereinafter, referred to as a "change position"). That is, in the image inspection system 1, the pre-switching distance, that is, the distance along the conveyance path from the second processing position D2 at which the processing by the second processing unit 120 is performed on the medium to the change position (switching position E1) at which a conveyance state of the conveying medium is changed, is longer than the maximum medium length. Accordingly, even if a medium of any size is conveyed, when the front end of the medium reaches the change position, the rear end of the medium passes through the processing position. As a result, according to the present exemplary embodiment, the posture of the medium at the second processing position D2 is hardly affected by the behavior of the medium at the change position.

[1-5] As for Processing Position

In the present exemplary embodiment, by performing the medium processing (image reading processing) in the straight-line portion of the U shape formed by the conveyance path B1, that is both of the first conveyance passage 11 and the second conveyance passage 21, the medium is likely to be a straight state at the processing position, as compared with a case where the medium processing is performed in the curved portion. Further, at the respective processing positions D1 and D2, the medium is conveyed in the direction along the vertical direction A102 as the conveyance direction. The posture of the medium tends to be more stable as the conveyance direction comes close to the vertical direction A102. The reason will be described in reference with FIGS. 4A to 4C.

Figure 4A:
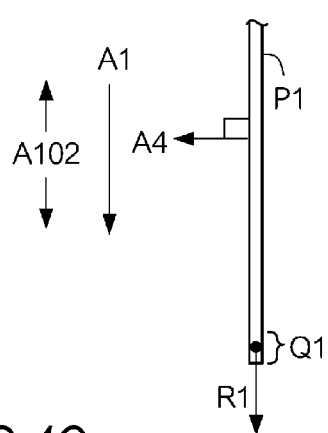
FIGS. 4A to 4C are views for describing a relationship between a conveyance direction and a posture of a medium.
Figure 4B:
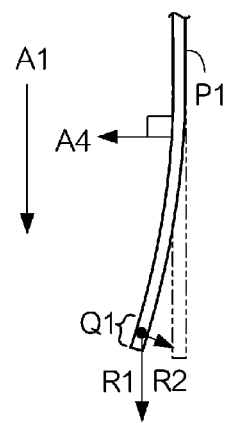
Figure 4C:
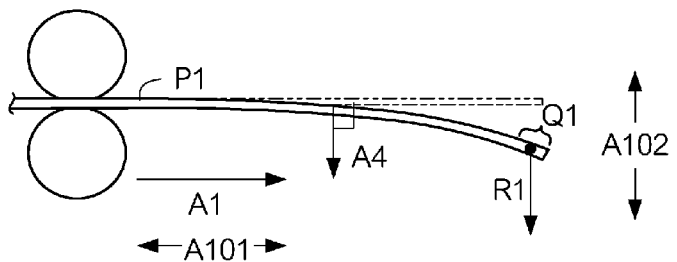

FIGS. 4A to 4C are views for describing a relationship between a direction of a conveyance direction and a posture of a medium. FIG. 4A illustrates a medium P1 which is being conveyed in a straight posture in the conveyance direction A1 along the vertical direction A102. In this case, for example, in a front end portion Q1 of the medium P1, gravity R1 is applied downwardly in the vertical direction A102. Further, in other portions of the medium P1, gravity is applied in this direction. Such gravity does not have a component of A4 which is a vertical line direction to the surface of the medium P1, as indicated by an arrow. A4, which indicates the vertical line direction, is a direction in which the medium P1 is deformed when bending occurs in the medium P1, and is referred to as a "bending direction", hereinafter. If a force is applied to the bending direction A4, bending easily occurs in the medium P1, as compared with a case where the force is not applied. In the state as illustrated in FIG. 4A, since the gravity does not have a component of the bending direction A4, bending of the medium P1 does not occur due to the gravity.

FIG. 4B illustrates the medium P1 in a posture of being bent by a force applied to the front end portion Q1. In this case, a component R2 of the vertical line direction to the surface of the front end portion Q1 of the medium P1 occurs in the gravity R1. The component R2 acts as a force that tends to return the front end portion Q1 to a position when the medium P1 is in a straight posture as indicated by a two-dot chain line in the figure. As such, the gravity is applied to the medium such that the medium is maintained in a straight posture along the conveyance direction A1, in a state where the medium is being conveyed in the conveyance direction A1 along the vertical direction A102.

FIG. 4C illustrates the medium P1 which is being conveyed in the conveyance direction A1 in the conveyance path along the horizontal direction A101. In this case, the gravity R1 is fully applied to the front end Q1 in the bending direction A4. Further, the gravity is fully applied to other portions of the medium P1 in the bending direction A4. As a result, the medium P1 is deformed in the bending direction A4, and in this figure, is in a posture in which the front end Q1 side hangs down in the vertical direction A102. If such a bending of the medium P1 occurs at the processing position, the distance between the processing unit and the medium P1 or the slope of the medium P1 to the processing unit will be changed. Then, the reading results of the image may be changed. For example, despite reading an image without unevenness, a result data showing an image with unevenness may be transmitted.

In the present exemplary embodiment, the medium is conveyed towards the conveyance direction (the first direction A10 and the second direction A20) along the vertical direction A102 at the processing position, as described above. Accordingly, the medium is easily held in a straight posture at the processing position, as compared with a configuration in which the processing is performed on the surface of the medium conveyed in the horizontal direction A101 (comparative configuration; hereinafter, referred to as "Configuration 2"). As a result, at a position where processing is performed on a conveying medium (that is, the processing position), the posture of the medium is stabilized, and the reading result of images also easily become stable, as compared with Configuration 2.

[2] Modified Embodiment

The above-described exemplary embodiment is only an example of embodiments of the present invention, and may be modified as follows. Further, the above-described exemplary embodiment and each modified embodiment as described below may be performed in combination, respectively, as necessary.

[2-1] Medium Processing

The medium processing (processing performed on a medium which is being conveyed) performed by the processing unit is not limited to the above-described image reading processing. The medium processing may be, for example, an ejection processing of ejecting an ink to a medium. Like the image reading processing, the ejection processing is processing in which, if the distance between the processing unit and the medium or the slope of the medium with respect to the processing unit is changed, the processing result may be changed, and thus, it is desirable to stabilize the posture of the medium. Any processing may be performed as the medium processing, so long as it is such processing.

[2-2] Pre-Processing Apparatus

The pre-processing apparatus is not limited to the above-described image forming apparatus. For example, between the image forming apparatus and the conveyance apparatus 3, an apparatus for correcting a curl (a wound state) of the medium generated when forming an image (also referred to as a decurler) may be disposed as the pre-processing apparatus. Any apparatus may be used as the pre-processing apparatus so long as the apparatus conveys a medium for performing a medium processing to the conveyance apparatus 3.

[2-3] Post-Processing Apparatus

The post-processing apparatus is not limited to the above-described apparatus. For example, in a case where the result data from the conveyance apparatus 3 indicates that an image is not formed accurately on the medium, the post-processing apparatus may perform processing of cutting the medium or notifying the content to a display unit or a terminal of an operator as the post-processing. Further, the post-processing performed by the post-processing apparatus may or may not follow the result of the medium processing performed by the conveyance apparatus. However, in a case where the post-processing is performed according to the result of the medium processing, by disposing the second processing unit 120 at a position closer to the returning conveyance unit 30 than the first processing unit 110 as in the exemplary embodiment, the time required to perform a determination based on the result of the medium may be increased, as compared with its opposite configuration (Configuration 1 as described above).

[2-4] Distance from Processing Position to Discharging Position

In the above exemplary embodiment, the pre-switching distance (the distance along the conveyance path from the second processing position D2 to the switching position E1) is set to be equal to or longer than the maximum medium length, but alternatively, the distance along the conveyance path B1 from the second processing position D2 to the discharging position C6 (hereinafter, referred to as a "pre-discharging distance") may be set to be equal to or longer than the maximum medium length. In the example of FIG. 2, the pre-discharging distance is represented as a length of L22+L50.

The conveyance state at the discharging position C6 may be changed by the post-processing apparatus in some cases. For example, there is a case where a step is caused by a difference in height between the feeding position at which the medium is fed and the discharging position C6 in the post-processing apparatus, and the medium behaves differently than before by colliding with a case of the post-processing apparatus. According to the present modified embodiment, even in such a case, the posture of the medium at the second processing position D2 is hardly affected by the behavior of the medium at the discharging position, as compared with a case where the pre-discharging distance is shorter than the maximum medium length. In other words, the posture of the medium at the second processing position D2 is hardly affected by the configuration of a downstream side of the discharging position C6.

[2-5] Length of Straight-Line Portion of Downstream of Processing Position

In addition to the above modified embodiment, the length of the second conveyance passage 21 on a downstream side in the conveyance direction A1 of the second processing position D2 (represented as a length of the straight-line conveyance passage on a downstream side of the second processing position D2; hereinafter, referred to as a "straight-line conveyance passage length") may be set to be equal to or longer than the maximum medium length. In the example of FIG. 2, the straight-line conveyance passage length is represented as L22, which is a length from the second processing position D2 to the inlet C5 of the discharging unit 50. The discharging conveyance passage 51 is formed in an arc so as to change the direction gradually to the horizontal direction A101. That is, once the medium enters the discharging conveyance passage 51, the medium may easily come in contact with a conveyance passage member (particularly, a conveyance passage member outside the arc), as compared with the time when the medium is conveyed in the second conveyance passage 21, and thus, may behave differently than before. According to the present modified embodiment, even in such a case, the posture of the medium at the second processing position D2 is hardly affected by the behavior of the medium at the discharging conveyance passage 51, as compared with a case where the straight-line conveyance passage length is shorter than the maximum medium length. In other words, the posture of the medium at the position where the processing by the second processing unit is performed on the conveying medium is hardly affected by the conveyance passage on a downstream side of the outlet of the second conveyance passage 21.

[2-6] Lengths of First and Second Conveyance Passages

The length of the first conveyance passage (a distance along the conveyance direction from the inlet C2 to the inlet C3 in the example of FIG. 2) and the length of the second conveyance passage (a length in sum of L21 and L22 in the example of FIG. 2) may be set to be equal to or longer than the maximum medium length. If the front end side and rear end side of the medium in which the processing has been performed at the processing position are present together in the arc-type conveyance passage (particularly, an arc-type conveyance that is bent in different directions), there is a concern that the distance between the processing unit and the medium at the medium position or the slope of the medium to the processing unit is changed. As in the present modified embodiment, in a case where the lengths of the first and second conveyance passages are equal to or longer than the maximum medium length, both of the front end side and the rear end side of the medium in which the processing has been performed at the processing position are not present together in the arc-type conveyance passage. Accordingly, compared with a case where the lengths of the first and second conveyance passages are shorter than the maximum medium length, the posture of the medium is easily stabilized in each conveyance passage. That is, the posture of the medium at each processing position is easily stabilized. Further, one or both of the first and second conveyance passages may be set to be equal to or longer than the maximum medium length.

[2-7] Direction in which the First and Second Directions are Headed

In the above-described exemplary embodiment, both of the first direction A10 and the second direction A20 are directions along the vertical direction A102, but not limited thereto. The first direction and the second direction may be directions inclined with respect to the vertical direction A102.

Figure 5:
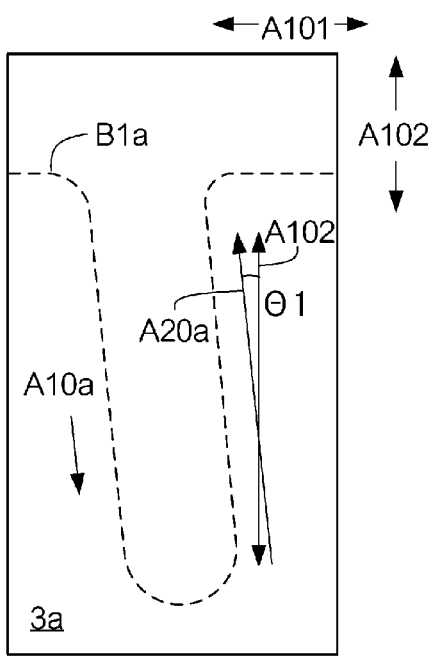
FIG. 5 is a view illustrating an example of a configuration of a conveyance apparatus according to a modified embodiment.

FIG. 5 is a view illustrating an example of a configuration of the conveyance apparatus according to the present modified embodiment. In this example, a conveyance apparatus 3a is illustrated, in which a medium is conveyed along a conveyance path B1a as indicated by a broken line. A first direction A10a and a second direction A20a along the straight-line portions (that is, portions in which the medium is conveyed in the first and second conveyance passages) of the U-shaped conveyance path B1a are inclined at an angle θ1 with respect to the vertical direction A102.

In this case, some components of the gravity applied to the medium conveyed in the first and second conveyance passages are applied to the bending direction as described in reference with FIGS. 4A to 4C, but the force is smaller, as compared with a case where the medium is conveyed in the conveyance direction along the horizontal direction A101 as illustrated in FIG. 4C. Accordingly, in the present modified embodiment, the posture of the medium is also stabilized at the processing position, as compared with Configuration 2 (a configuration in which the processing is performed on a surface of the medium conveyed in the horizontal direction A101) as described above. Such stabilization of the posture is obtained as long as each of the first direction A10 and the second direction A20 forms an angle with respect to the horizontal direction (that is, not orthogonal to the vertical direction A102).

[2-8] Second Direction

The second direction was an opposite direction to the first direction in the exemplary embodiment, but not limited thereto.

Figure 6:
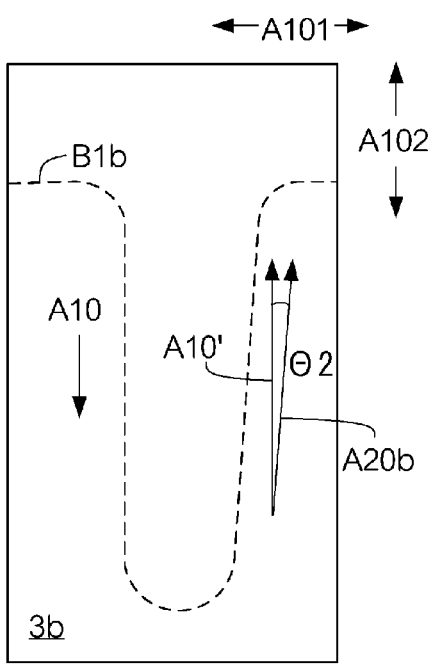
FIG. 6 is a view illustrating another example of a configuration of a conveyance apparatus according to another modified embodiment.

FIG. 6 is a view illustrating another example of a configuration of a conveyance apparatus according to another modified embodiment. In this example, a conveyance apparatus 3b is illustrated, in which a medium is conveyed along a conveyance path B1b as indicated by a broken line. Among first and second directions A10 and A20b along the straight-line portions (that is, portions in which the medium is conveyed in the first and second conveyance passages) of the U-shaped conveyance path B1b, the first direction A10 follows the vertical direction A102, but the second direction A20b is inclined at an angle θ2 with respect to the vertical direction A102. That is, the second A20b is inclined at the angle θ2 with respect to an opposite direction A10' which is opposite to the first direction A10. In this case, the posture of the medium is also stabilized at the processing position, as compared with Configuration 2 (a configuration in which the processing is performed on a surface of the medium conveyed in the horizontal direction A101), as described in the above modified embodiment.

In the example of FIG. 6, since the second direction A20b has a component of the opposite direction (a direction to which the opposite direction A10' directs) to the first direction A10, the medium is conveyed in the first direction A10 in the first conveyance passage, and then conveyed in the opposite direction A10' in the second conveyance passage. Accordingly, even in a case where the length in the first direction of the conveyance apparatus is short, the conveyance path can be accommodated in the apparatus, as compared with a case where the medium conveyed in the first direction is not conveyed in its opposite direction. As such, in the conveyance apparatus, it is desirable that the second direction has a component of the opposite direction to the first direction.

[2-9] Second Processing Unit

The second processing unit may perform a processing on the second surface of the medium which is being conveyed in the first conveyance passage.

Figure 7:
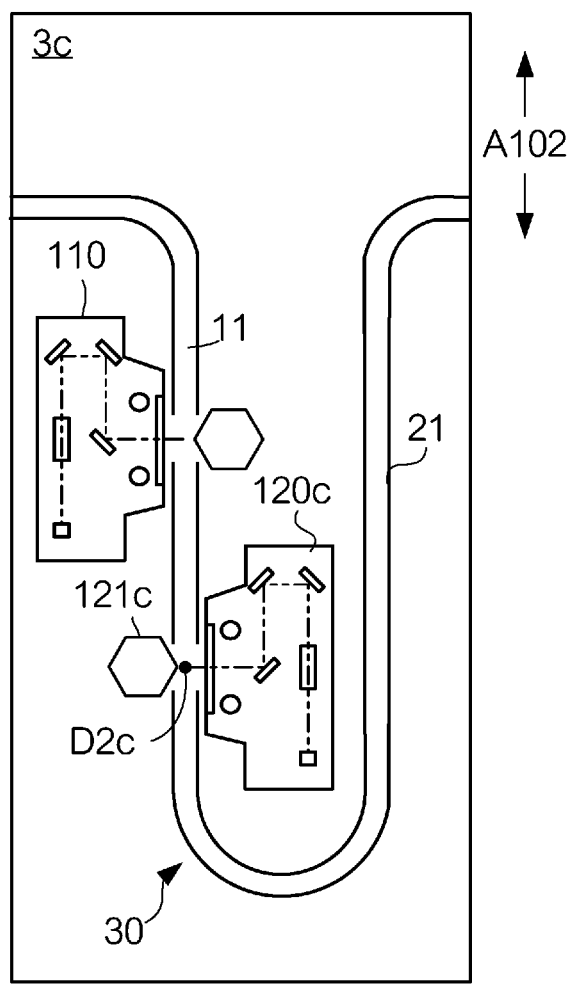
FIG. 7 is a view illustrating an example of a configuration of a conveyance apparatus according to another modified embodiment.

FIG. 7 is a view illustrating an example of a configuration of a conveyance apparatus according to the present modified embodiment. In this example, there is illustrated a conveyance apparatus 3c which includes a second processing unit 120c configured to read an image from a medium at a processing position D2c in the first conveyance passage 11, and a second relevant member 121c disposed correspondingly thereto. In this case, the time required to perform a determination based on the result of the medium processing may also be increased, as compared with its opposite configuration (Configuration 1 as described above). Further, in the present modified embodiment, since both of the processing unit and the relevant member are not disposed at the post-processing apparatus 4 side of the second passage 21, the width of the conveyance apparatus is decreased, as compared with a configuration in which any one of the processing unit and the relevant member is disposed there (for example, the configuration illustrated in FIG. 2).

[2-10] First and Second Processing Units

The first and second processing units may be disposed so as to perform a processing on a surface of the medium at an opposite side to the example as illustrated in FIG. 2, respectively.

Figure 8:
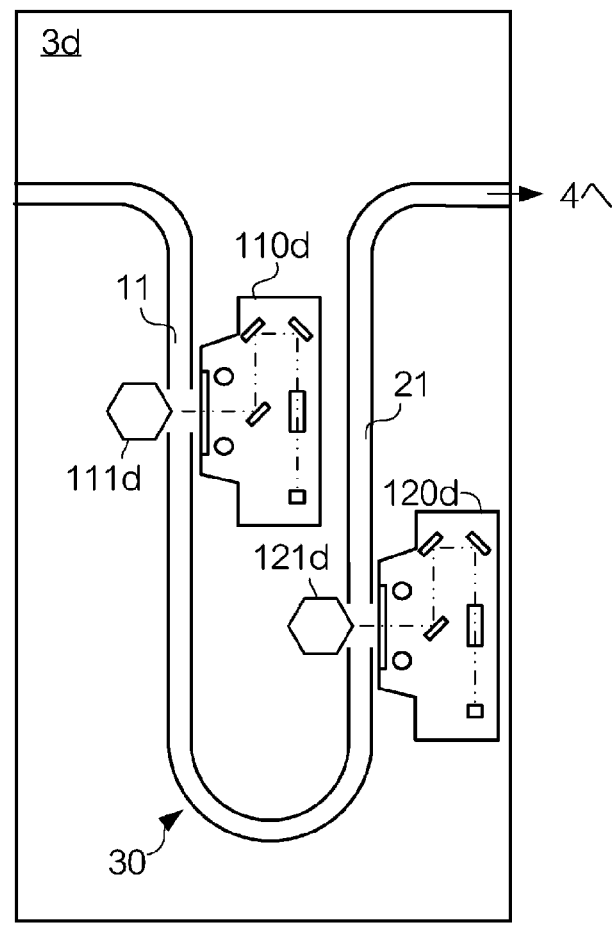
FIG. 8 is a view illustrating an example of a configuration of a conveyance apparatus according to another modified embodiment.

FIG. 8 is a view illustrating an example of a configuration of a conveyance apparatus according to the present modified embodiment. In this example, there is illustrated a conveyance apparatus 3d which includes a first processing unit 110d configured to perform processing on a surface at the post-processing apparatus 4 side of a medium conveyed in the first conveyance passage 11 which serves as a first surface, a second processing unit 120d configured to perform processing on a second surface in this case, and a first relevant member 111d and a second relevant member 121d disposed correspondingly thereto, respectively. In this case, it is also desirable that the second processing unit 120d is disposed at a position closer to the returning conveyance unit 30 than the first processing unit 11d.

[2-11] First and Second Relevant Members

Any one or both of the first and second relevant members may not be provided in the conveyance apparatus. Even in that case, since the medium is conveyed as in the above exemplary embodiment or modified embodiments, the medium is easily held in a straight state at the processing position, and the posture of the medium is stabilized at the processing position.

[2-12] Feeding Position and Discharging Position

The feeding position and the discharging position may be provided at different positions from the example as illustrated in FIG. 2.

FIGS. 9A and 9B are views illustrating an example of a configuration of a conveyance apparatus according to the present modified embodiment. FIG. 9A illustrates a conveyance apparatus 3e in which a feeding position C1e and a discharging position C6e are different from each other in the vertical direction A102. Thus, for example, even though a position at which the pre-processing apparatus discharges a medium and a position at which the post-processing apparatus feeds a medium are in discord with each other in the vertical direction A102, the feeding position and the discharging position may be provided in accordance with these positions. Since the conveyance apparatus is provided with the feeding unit and the discharging unit, the feeding position and the discharging position are able to be disposed freely, as compared with a case where the feeding unit and the discharging unit are not provided.

FIG. 9B illustrates a conveyance apparatus 3f in which an inlet of a first conveyance passage 11f serves as a feeding position C1f, and an outlet of a second conveyance passage 21f serves as a discharging position C6f. That is, the conveyance apparatus 3f are not provided with the feeding unit and the discharging unit as illustrated in FIG. 2. In this case, a pre-processing apparatus 2f has a shape covering the feeding position C1f of the conveyance apparatus 3f, and discharges a medium towards the feeding position C1f. In addition, a post-processing apparatus 4f has a shape covering the discharging position C6f of the conveyance apparatus 3f, and feeds a medium discharged from the discharging position C6f. Thus, the conveyance apparatus is preferably provided with at least a first conveying unit, second conveying unit and a returning conveyance unit as a conveying unit conveying a medium.

[2-13] Returning Conveyance Unit

Although the returning conveyance unit is installed at a lower side in the vertical direction A102 in the exemplary embodiment, the returning conveyance unit may be installed at an upper side in the vertical direction A102. In this case, the first conveying unit, the returning conveyance unit and the second conveying unit form a reverse U shape. Even in this case, since the first conveying unit is installed so as to follow the first direction forming an angle with respect to the horizontal direction A101, the posture of the medium is stabilized at the processing position, as compared with Configuration 2 (a configuration in which the processing is performed on a surface of the medium conveyed in the horizontal direction A101) as described above.

[2-14] Category of the Invention

In addition to the conveyance apparatus, the present invention is also considered as a conveyance system including a conveyance apparatus, a pre-processing apparatus and a post-processing apparatus. The pre-processing apparatus as mentioned herein is an apparatus that performs a predetermined pre-processing on a medium and discharges the medium towards the conveyance apparatus. The post-processing apparatus is an apparatus that performs a predetermined post-processing on the medium discharged from the conveyance apparatus. The image inspection system 1 as described in the exemplary embodiment is an example of the conveyance system. The conveyance apparatus is considered as an image reading apparatus in a case of reading an image formed on the medium conveyed, and is also considered as an image forming apparatus in a case of forming an image on the medium conveyed. In the present invention, the conveyance apparatus refers to, for example, one that performs a predetermined processing a medium while conveying the medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A conveyance system comprising:
    a conveyance apparatus that comprises:
        a first conveying unit that includes a first conveyance passage along a first direction forming an angle with respect to a horizontal direction, and conveys a medium in the first direction;
        a returning conveyance unit that conveys the medium conveyed by the first conveying unit towards a second direction having a component of an opposite direction to the first direction;
        a second conveying unit that includes a second conveyance passage along the second direction, and conveys the medium conveyed by the returning conveyance unit in the second direction;
        a first processing unit that is disposed on the first conveyance path, and performs processing on a first surface of the conveying medium; and
        a second processing unit that is disposed on a downstream side of the first processing unit in a conveyance path of the medium and disposed at a position closer to the returning conveyance unit than the first processing unit, and performs processing on a second surface of the conveying medium, the second surface being an opposite side to the first surface; and
    a post-processing apparatus that performs post-processing on the medium discharged from the conveyance apparatus, the medium being subjected to the processing by the first processing unit and subjected to the processing by the second processing unit,
    wherein a distance along the conveyance path from a processing position at which the processing by the second processing unit is performed on the medium to a change position at which a conveyance state of the conveying medium is changed, is equal to or longer than a maximum length of the medium in a conveyance direction of the medium.

2. The conveyance system of claim 1, the conveyance apparatus further comprising:
    a first relevant member that is disposed at a position opposite to the first processing unit across the first conveyance passage, and performs an operation for the processing by the first processing unit; and
    a second relevant member that is disposed at a position opposite to the second processing unit across the conveyance path of the medium, and performs an operation for the processing by the second processing unit.

3. The conveyance system of claim 2, wherein the first processing unit performs a reading of an image formed on the first surface of the conveying medium,
    the second processing unit performs a reading of an image formed on the second surface of the conveying medium,
    the first relevant member performs an operation for color compensation of the image read by the first processing unit, and
    the second relevant member performs an operation for color compensation of the image read by the second processing unit.

4. The conveyance system according to claim 2, wherein the first relevant member and a part of the second processing unit are disposed in the first direction.

5. The conveyance system of claim 1, the conveyance apparatus further comprising:
    a feeding unit that feeds the medium from a feeding position at which the medium is fed to the conveyance apparatus, up to the first conveying unit; and
    a discharging unit that discharges the medium conveyed by the second conveying unit up to a discharging position at which the medium is discharged from the conveyance apparatus.

6. The conveyance system according to claim 1, further comprising:
    a pre-processing apparatus that performs pre-processing on the medium and discharges the medium towards the conveyance apparatus.

7. The conveyance system according to claim 1, wherein the first direction is a substantially vertical direction.

8. A conveyance system comprising:
    a conveyance apparatus that comprises:
        a first conveying unit that includes a first conveyance passage along a first direction forming an angle with respect to a horizontal direction, and conveys a medium in the first direction;
        a returning conveyance unit that conveys the medium conveyed by the first conveying unit towards a second direction having a component of an opposite direction to the first direction;
        a second conveying unit that includes a second conveyance passage along the second direction, and conveys the medium conveyed by the returning conveyance unit in the second direction;

a first processing unit that is disposed on the first conveyance path, and performs processing on a first surface of the conveying medium; and a second processing unit that is disposed on a downstream side of the first processing unit in a conveyance path of the medium and disposed at a position closer to the returning conveyance unit than the first processing unit, and performs processing on a second surface of the conveying medium, the second surface being an opposite side to the first surface; and a post-processing apparatus that performs post-processing on the medium discharged from the conveyance apparatus, the medium being subjected to the processing by the first processing unit and subjected to the processing by the second processing unit, wherein a distance along the conveyance path from a processing position at which the processing by the second processing unit is performed on the medium to a discharging position at which the medium is discharged from the conveyance apparatus, is equal to or longer than a maximum length of the medium in a conveyance direction of the medium.

9. The conveyance system according claim 8, wherein the conveyance apparatus further comprising:

a first relevant member that is disposed at a position opposite to the first processing unit across the first conveyance passage, and performs an operation for the processing by the first processing unit; and a second relevant member that is disposed at a position opposite to the second processing unit across the conveyance path of the medium, and performs an operation for the processing by the second processing unit, the first processing unit performs a reading of an image formed on the first surface of the conveying medium, the second processing unit performs a reading of an image formed on the second surface of the conveying medium, the first relevant member performs an operation for color compensation of the image read by the first processing unit, and the second relevant member performs an operation for color compensation of the image read by the second processing unit.

10. A conveyance system comprising:

a conveyance apparatus that comprises:

a first conveying unit that includes a first conveyance passage along a first direction forming an angle with respect to a horizontal direction, and conveys a medium in the first direction;

a returning conveyance unit that conveys the medium conveyed by the first conveying unit towards a second direction having a component of an opposite direction to the first direction;

a second conveying unit that includes a second conveyance passage along the second direction, and conveys the medium conveyed by the returning conveyance unit in the second direction;

a first processing unit that is disposed on the first conveyance path, and performs processing on a first surface of the conveying medium; and a second processing unit that is disposed on a downstream side of the first processing unit in a conveyance path of the medium and disposed at a position closer to the returning conveyance unit than the first processing unit, and performs processing on a second surface of the conveying medium, the second surface being an opposite side to the first surface; and a post-processing apparatus that performs post-processing on the medium discharged from conveyance apparatus, the medium being subjected to the processing by the first processing unit and subjected to the processing by the second processing unit, wherein the second processing unit performs the processing on the conveying medium in the second conveyance passage, and a length of a straight-line portion of the second conveyance passage on a downstream side of the processing position in a conveyance direction of the medium, at which the processing by the second processing unit is performed on the medium, is equal to or longer than a maximum length of the medium in the conveyance direction.

11. The conveyance system according to claim 10, wherein the conveyance apparatus further comprising:

a first relevant member that is disposed at a position opposite to the first processing unit across the first conveyance passage, and performs an operation for the processing by the first processing unit; and a second relevant member that is disposed at a position opposite to the second processing unit across the conveyance path of the medium, and performs an operation for the processing by the second processing unit, the first processing unit performs a reading of an image formed on the first surface of the conveying medium, the second processing unit performs a reading of an image formed on the second surface of the conveying medium, the first relevant member performs an operation for color compensation of the image read by the first processing unit, and the second relevant member performs an operation for color compensation of the image read by the second processing unit.

* * * * *